US006985928B2

(12) United States Patent
Zhang et al.

(10) Patent No.: US 6,985,928 B2
(45) Date of Patent: Jan. 10, 2006

(54) PLACING AN OBJECT AT A NODE IN A PEER-TO-PEER SYSTEM BASED ON A ZOOM-IN ALGORITHM

(75) Inventors: Zheng Zhang, San Jose, CA (US); Mallik Mahalingam, Sunnyvale, CA (US); Zhichen Xu, Sunnyvale, CA (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 10/260,431

(22) Filed: Oct. 1, 2002

(65) Prior Publication Data

US 2004/0064522 A1 Apr. 1, 2004

(51) Int. Cl.
*G06F 15/167* (2006.01)
*G06F 9/50* (2006.01)
(52) U.S. Cl. .................................. 709/213; 718/104
(58) Field of Classification Search ............... 709/213, 709/214, 215, 216; 707/205; 718/104, 105; 719/316
See application file for complete search history.

(56) References Cited

U.S. PATENT DOCUMENTS 5,915,095 A * 6/1999 Miskowiec ................. 709/223
6,711,571 B2 * 3/2004 Putzolu ......................... 707/9

OTHER PUBLICATIONS

Druschel et al., "PAST: A Large-Scale, Persistent Peer-to-peer Storage Utility", IEEE 0-7695-1040-X/01, 2001, pp. 75-80.*

Ranganathan et al., "Improving Data Availability through Dynamic Model-Driven Replication in Large Peer-to-Peer Communities", IEEE/ACM International Symposium on Cluster Computing and the Grid, Jul. 2002.*
Bolosky, W. et al., "Feasibility of a Serverless Distributed File System Deployed on an Existing Set of Desktop PCs", SIGMETRICS 2000, Santa Clara, CA.
Clarke, I. et al., "Freenet: A Distributed Anonymous Information Storage and Retrieval System", Workshop on Design Issues in Anonymity and Unobservability, 2000, Berkeley, CA.
Dabek, F. et al., "Wide-Area Cooperative Storage with CFS", Symposium on Operating Systems Principles (SOSP), 2001, Banff, Canada.
Kleiman, S.R., "Vnodes: An Architecture for Multiple File System Types in Sun UNIX", USENIX Conference, 1986, Atlanta, GA.
Kubiatowicz, J. et al., "OceanStore: An Architecture for Global-Scale Persistent Storage", ASPLOS 2000, MA.
Ratnasamy, S. et al., "A Scalable Content-Addressable Network", ACM SIGCOMM 2001, San Diego, CA.
Roselli, D., et al., "Comparison of File System Workloads", USENIX Annual Technical Conference, 2000, San Diego, CA.
Stoica, I. et al., "Chord: A Scalable Peer-to-Peer Lookup Service for Internet Applications", ACM SIGCOMM 2001, San Diego, CA.

* cited by examiner

*Primary Examiner*—Gary Portka
(74) *Attorney, Agent, or Firm*—Richard P. Lange (57) ABSTRACT

A peer-to-peer system is divided into a plurality of zones for placing an object. A parent zone having a parent node is identified. The parent zone is divided into the plurality of zones, i.e., subzones, and one of subzones is selected. A node in the subzone is selected for placing the object.

16 Claims, 5 Drawing Sheets

PLACING AN OBJECT AT A NODE IN A PEER-TO-PEER SYSTEM BASED ON A ZOOM-IN ALGORITHM

FIELD OF THE INVENTION

The invention is generally related to peer-to-peer systems. More particularly, the invention is related to placing an object in a peer-to-peer system.

BACKGROUND OF THE INVENTION

With the rapid growth of the Internet and the ever-rising demand of applications, building a highly scalable infrastructure is increasingly important. A peer-to-peer (P2P) system provides an infrastructure that may meet those demands, especially for storage systems.

A P2P system of nodes (or peers) interconnected via one or more networks provides a relatively convenient and scalable means for storing and exchanging information. However, current P2P storage systems offer a flat storage space, where no techniques, other than using distributing hash tables to store and retrieve objects, are employed for organizing data stored in the P2P system. Factors for optimizing storage systems, such as storage utilization and data organization, should be considered when building a storage system on a P2P system.

SUMMARY OF THE INVENTION

According to an embodiment of the invention, a method for placing an object in a peer-to-peer system comprises selecting a parent zone having a plurality of nodes in the peer-to-peer system, wherein the parent zone includes a node hosting a parent object. The method also includes dividing the parent zone into k subzones; selecting one of the subzones; selecting a node in the selected subzone; and placing the object in the selected subzone.

According to another embodiment of the invention, a peer-to-peer system comprises a plurality of nodes including a parent node hosting a parent object. The parent node is operable to identify a parent zone including the parent node and to divide the parent zone into a plurality of subzones for placing a child object associated with the parent object.

According to yet another embodiment of the invention, a node in a peer-to-peer system comprises means for selecting a parent zone having a plurality of nodes in the peer-to-peer system, where the parent zone includes a node hosting a parent object. The system further comprises means for dividing the parent zone into k subzones; means for selecting one of the subzones; means for selecting a node in the selected subzone; and means for placing the object in the selected subzone.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
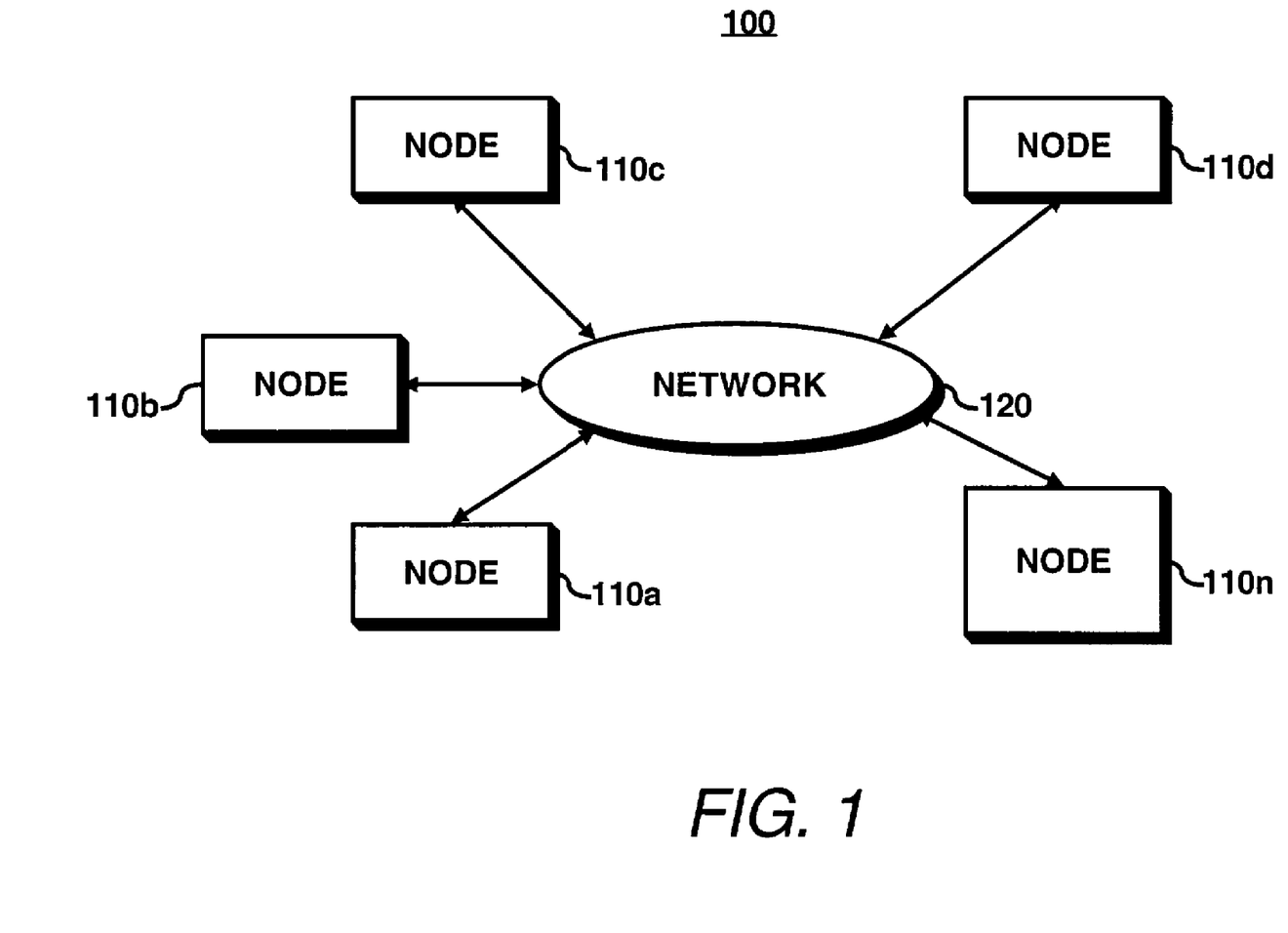
FIG. 1 illustrates a P2P system, according to an embodiment of the invention.

FIG. 1 illustrates an exemplary block diagram of a system 100 where an embodiment of the present invention may be practiced. It should be readily apparent to those of ordinary skill in the art that the system 100 depicted in FIG. 1 represents a generalized schematic illustration and that other components may be added or existing components may be removed or modified without departing from the spirit or scope of the present invention.

As shown in FIG. 1, the system 100 includes a plurality of nodes 110a ... 110n functioning as peers in a P2P system. The nodes 110a ... 110n may be operable to exchange information among themselves and with other network nodes over a network 120. The nodes 110a ... 110n may also be operable to determine which nodes 110a ... 110n are valid and perform other functions (object search and retrieval, object placement, etc.) of a peer in a P2P system. Objects may include files, URLs, etc. The nodes 110a ... 110n may be computing platforms (e.g., personal digital assistants, laptop computers, workstations, servers, and other similar devices) that have a network interface. The nodes 110a ... 110n may be further operable to execute one or more software applications (not shown) that include the capability to share information (e.g., data, applications, etc.) in a P2P manner.

The network 120 may be operable to provide a communication channel among the nodes 110a ... 110n. The network 120 may be implemented as a local area network, wide area network or combination thereof. The network 120 may implement wired protocols, such as Ethernet, token ring, etc., wireless protocols, such as Cellular Digital Packet Data, Mobitex, IEEE 801.11b, Bluetooth, Wireless Application Protocol, Global System for Mobiles, etc., or combination thereof.

In one embodiment, the system 100 is a distributed hash system (e.g., CAN, Pastry, Tapestry, Chord, etc.). In a distributed hash system a lookup for locating an object in the system 100 is performed by searching with a key associated with the object. These systems typically "guarantee" the retrieval of an existing object by searching with the key, as apposed to a system, such as Freenet, which typically does not provide an equivalent level of "guaranteed" object retrieval.

In one embodiment, the system 100 includes a distributed file system having a treelike structure overlaid on a P2P system. Each object (e.g., directories containing meta data, files containing other data, etc.) in the system 100, which can reside on any of the nodes 110a ... n, contains names of children objects and location information (e.g., point(s) in the Cartesian space in the case of CAN) for each child object. Name and location information for children objects may be stored as meta data with the objects. When location information is provided with directories, the placement of objects in the system 100 becomes controllable. Objects may be placed in the system 100 to minimize lookup costs, such as described in detail below.

Lookups comprise a high portion of total metadata operations in file systems. A lookup in a file system is performed to resolve a location of an object. This is done by resolving one component at a time in a path to the object until all the components in the path are resolved. At the end of the lookup process the location of where the object resides is returned.

In the system 100, where a distributed file system is overlaid on a P2P system, a parent object may reside at one location in the P2P system, and a child object may reside in another location in the P2P system. The locations, for example, can be same node in the P2P system, different file systems within the same node, or different nodes altogether. This is generally irrespective of whether or not the distributed file system is overlaid on a P2P system.

In order to resolve a path to an object in the system 100, a lookup operation may require visiting every component in the path. Path resolution typically includes routing a query to a node hosting the parent object. The parent object, which may be a parent directory, then transmits the query to the next component in the path to the object. Because each object in the system 100 may include location information for children objects in the system 100, each object can route the query to a child object in the path. The query is transmitted to each component in the path until the desired object is located. After the path is resolved, the object may be retrieved using the path.

Lookup costs may be measured based on the number of routing hops (i.e., logical hops) taken by the query in the system 100. A lookup cost may be expressed as D multiplied by h, where D is the length of a complete path (e.g., "/a/b/d") to an object and h is the number of logical routing hops resolving one component of the path. The logical hop is a routing hop in an overlay network, such as CAN. Each logical hop may comprise multiple IP-level physical hops.

By controlling placement, lookup costs for the system 100 may be minimized. For example, by placing child objects in close proximity to parent objects, the number of logical hops taken by a query for resolving a path are limited.

Figure 2A:
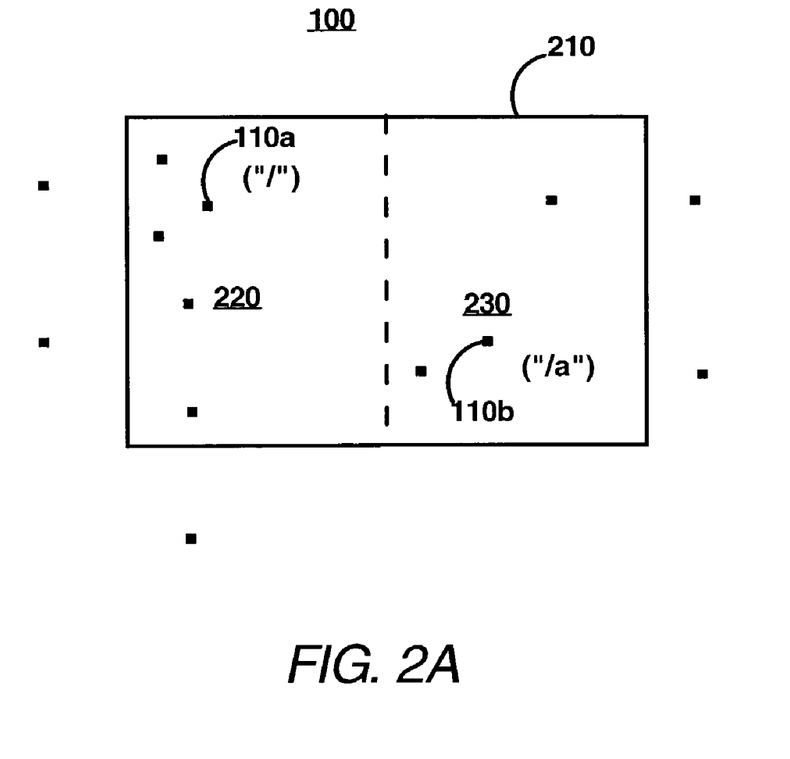
FIGS. 2A–B illustrate placement of child objects in the system shown in FIG. 1 using a zoom-in algorithm, according to an embodiment of the invention.
Figure 2B:
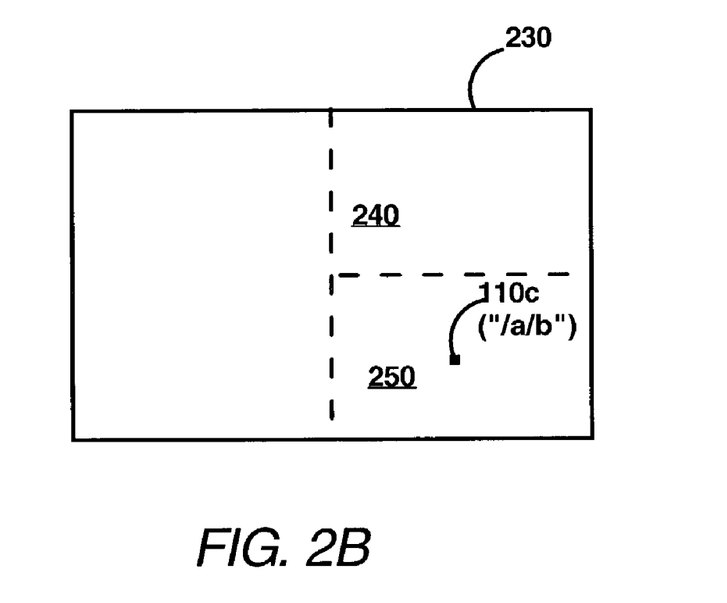

According to an embodiment of the invention, objects may be placed in the system 100 using a zoom-in algorithm, which minimizes lookup costs. FIGS. 2A–B illustrate placing objects in the system 100 using the zoom-in algorithm having two degrees (i.e., the number of sub-zones the parent is divided by). It will be apparent to one of ordinary skill in the art that the zoom-in algorithm may use other degrees (e.g., 2, 4, 8, etc.).

A zone (i.e., a parent zone 210) where a parent object (e.g., hosted by node 110a) lives is identified. A zone may include a logical space including one or more objects. For example, the parent object may be a root directory ("/"). Objects placed in the system 100 are not limited to directories and may include data files, etc. The size of the parent zone 210 can be selected based on a variety of factors (e.g., number of nodes in the system 100, system storage utilization, system lookup costs, etc.). The parent zone 210 is divided into two subzones 220 and 230. One of the two subzones is randomly selected (e.g., subzone 230). A child object (e.g., "/a") is randomly placed in the subzone 230, such as at the node 110b in the sub-zone 230.

In FIG. 2B, the subzone 230 is divided into two subzones 240 and 250 for placing another object (e.g., "/a/b"), which is a child of the object (e.g., "/a") placed at the node 110b. One of the two subzones 240 and 250 are randomly selected (e.g., subzone 240), and a node (e.g., node 110c) in the subzone 240 is randomly selected for hosting the child object. Further subdividing of zones may continue for placement of other child objects. Eventually, only one node will be available in a subzone for hosting child objects, resulting in zero lookup costs for those objects. Furthermore, use of subzones limits the proximity and number of nodes that may store a child object, resulting in lower lookup costs.

When a priori knowledge of a tree (e.g., the tree-structure of a file system overlaid on the P2P system) is available, such as for a digital library, it is possible to intelligently divide (e.g., vary k and sub-zone sizes accordingly) a parent zone (e.g., the parent zone 210) into subzones.

The intelligently division algorithm includes two steps. In a first step, the entire tree is traversed in post-order, and each node is assigned a weight that indicates the amount of storage requirements for the sub-tree rooted at each node. In a second step, the tree is traversed again and each node is placed into a zone whose size is proportional to the weight assigned to that node. When the shape of the tree changes causing a zone for a subtree to become over crowded, a new and less crowded subzone may be created for placing new objects of the sub-tree that otherwise would fall into the over crowded area.

Figure 3:
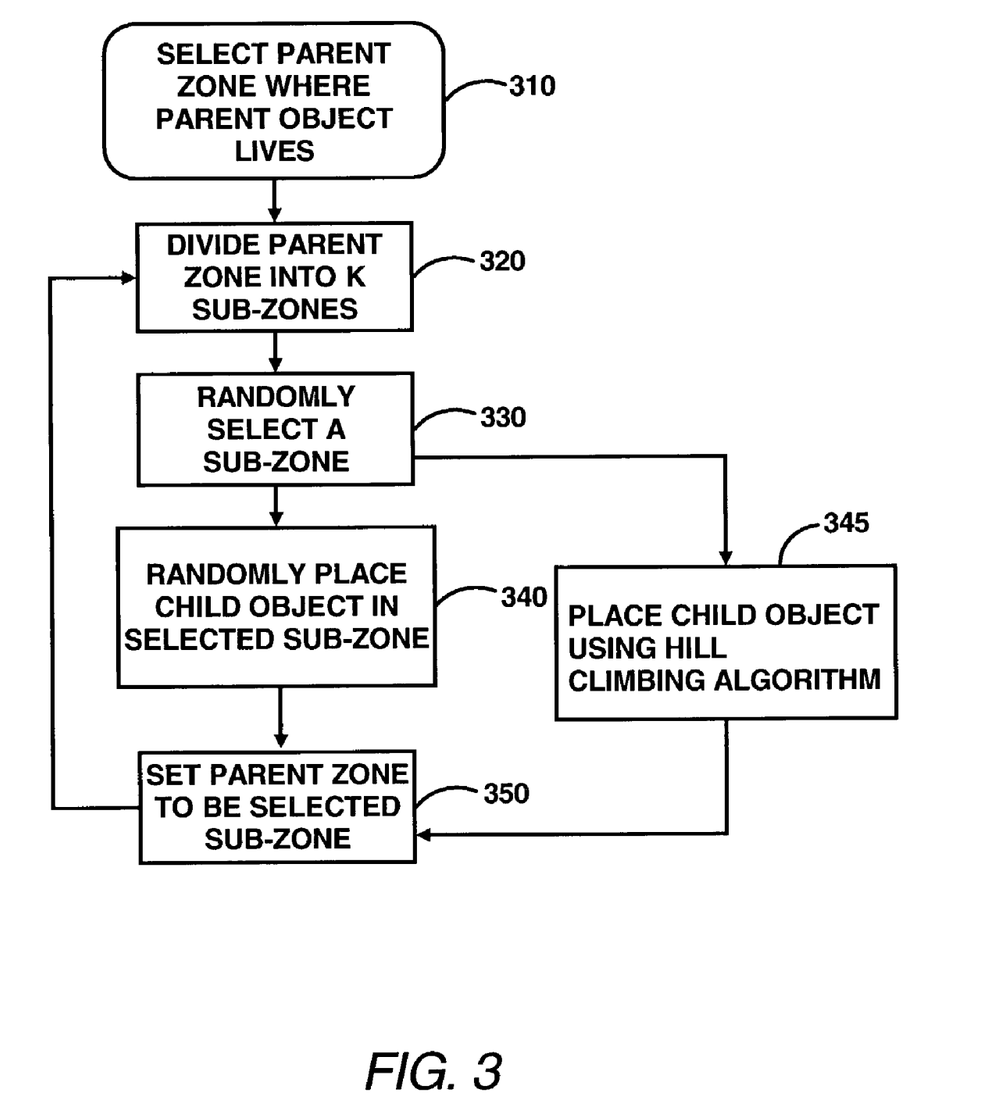
FIG. 3 illustrates a flow diagram of a method for placing an object using the zoom-in algorithm, according to an embodiment of the invention.

FIG. 3 illustrates a method 300 for placing objects using a zoom-in algorithm, according to an embodiment of the invention. In step 310, a parent zone is selected. The parent zone includes a node hosting a parent object (i.e., parent node) of the object being placed (i.e., the child object). For example, for a CAN implementation of a P2P network in the system 100, coordinates in the Cartesian space in the CAN are used to define the area of a parent zone. Other techniques for other P2P implementations may be used for defining the area of the parent zone.

In step 320, the parent zone is divided into "k" subzones, where "k" is the zoom-in degree. FIGS. 2A–B illustrate a zoom-in degree of 2, such that the parent zone is divided into 2 subzones. Other zoom-in degrees may be used (e.g., 2, 4, 8, etc.). As described above, the parent zone may be intelligently divided based on the amount of storage requirements for a sub-tree rooted at each node, if priori knowledge of a tree is available. For example steps for dividing the parent zone may include traversing the entire tree in post-order to assign a weight to each node, and assigning each node to a zone having a size proportional to the weight assigned to that node. The weight assigned to each node is associated with a storage requirement for a sub-tree rooted at each node. Also, when certain zones become crowded, a subzone having the least number of nodes may be selected for placing the object.

In step 330, one of the subzones, which was created by dividing the parent subzone, is randomly selected by the parent node. For example, the parent node may randomly generate a "key" that falls in that selected subzone, and route to that key. The node that owns that key responds to the request and places the child object. In step 340, a node, which is in the selected subzone, is randomly selected for placing the child object. If another child object is to be placed, the subzone selected in step 330 is further subdivided in steps 320–350. The steps 320–350 may be repeated for placement of other child objects.

To maximize storage utilization a hill-climbing algorithm (step 345) may be used for selecting a node to place the object instead of randomly placing the child object (step 340). The hill-climbing algorithm is disclosed in co-pending U.S. patent application Ser. No., 10/264,430 herein incorporated by reference. The hill-climbing algorithm is also described in detail below.

Figure 4:
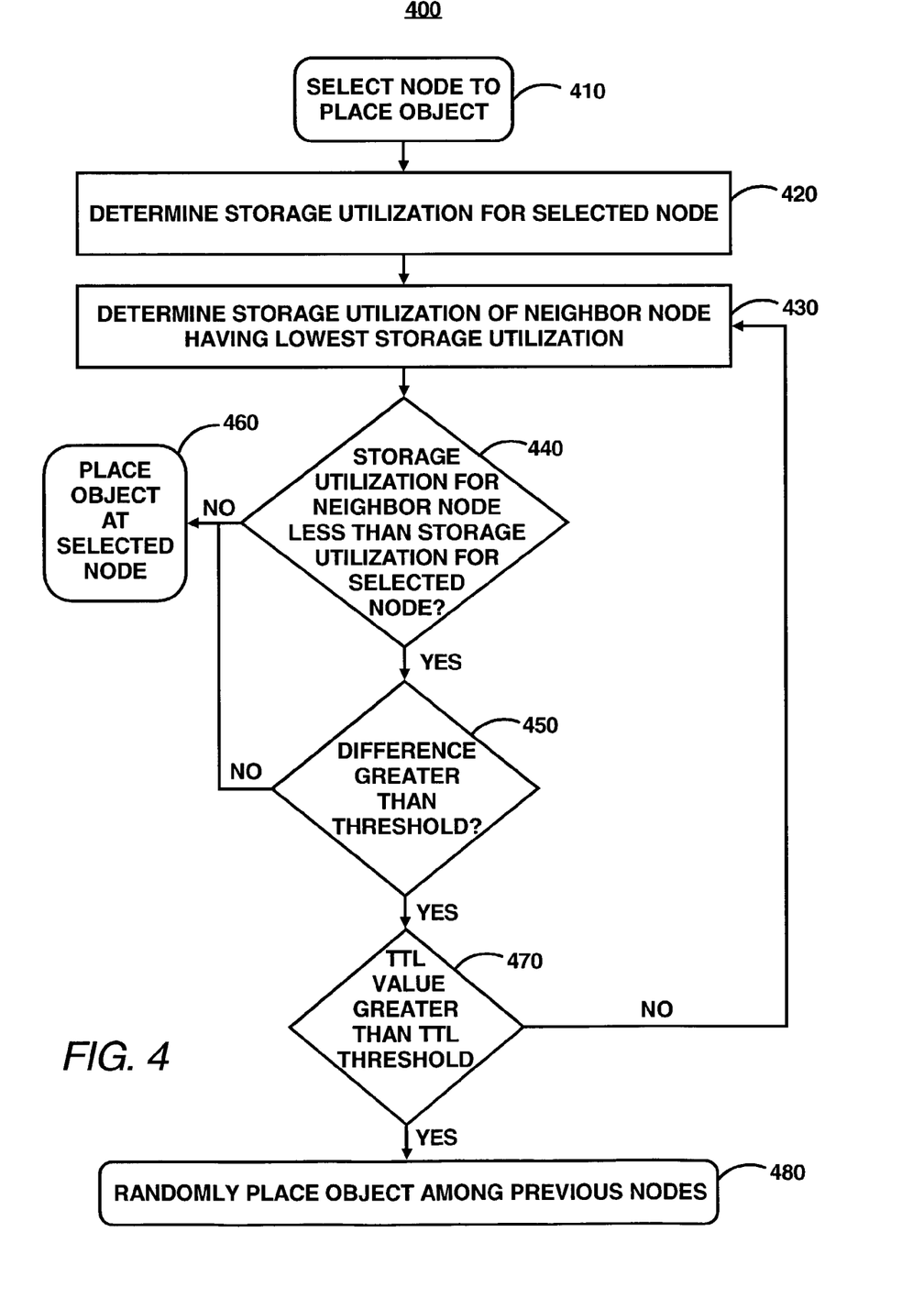
FIG. 4 illustrates a flow diagram of a method for selecting a node using a hill-climbing algorithm, according to an embodiment of the invention.

FIG. 4 illustrates a method 400, according to an embodiment of the invention, for placing an object in the system 100 using the hill-climbing algorithm. The steps in the method 400 may be performed instead of the step 340 in the method 300.

In step 410, a node (e.g., the node 110b) is selected for placing the object. The node may be randomly selected and becomes the starting point in the hill-climbing algorithm for placing the object. In step 420, storage utilization for the node 110b is determined. For example, the node 110b may periodically compute storage utilization, using known techniques, and store it in memory. The storage utilization includes the memory capacity being used to store objects in a node at a given time. The storage capacity may fluctuate at different times. For example, when data surges occur in the system 100, storage capacity may be over 80%, and only 20% or less of the total memory capacity of the node is not being used to store objects.

In step 430, storage utilizations for neighbor nodes are determined. A neighbor node, for example, is a node whose address is kept in the current node, such as node 110b. In one embodiment, storage utilization for all the neighbor nodes is determined, and the neighbor node with the lowest storage utilization is selected for possible placement of the object. Storage utilizations for neighbor nodes may be determined using heartbeats. For example, heartbeats are typically exchanged between nodes to determine a status of the nodes. Storage utilization information may be included in heartbeats exchanged between neighbor nodes.

In step 440, the node 110b determines if the storage utilization for the neighbor node with the lowest storage utilization, which may be node 110c, is less than the storage utilization for itself. If the storage utilization for the neighbor node with the lowest storage utilization is less than the storage utilization for the node 110b, then the difference between the storage utilization of 110b and neighbor node with the lowest storage utilization is compared to a threshold (step 450). In step 450, the threshold may be based on the total number of nodes and the total number of objects in the system. If the number of nodes and number of objects is not known, then an absolute value weighted with parameters of the system may be used. If the difference is greater than the threshold (as determined in step 450), then a time-to-live (TTL) value is compared to a TTL threshold (step 470) for limiting the number of hops the placement takes, as discussed below.

In step 450, if a determination is made that the difference between the storage utilization of 110b and the storage utilization of the node 110c (i.e., the neighbor node with the lowest storage utilization) is less than the threshold, then the object is placed at the node 110b (step 460).

In steps 440 and 450, ties may be randomly resolved. For example, if the storage utilizations for the nodes 110b and 110c are substantially the same in step 440, then placement of the object may be randomly selected. For example, whether the object is placed at the node 110b or whether the object is placed at another node (e.g., node 110c) is randomly determined. In step 450, if the difference is substantially the same as the threshold, then placement may also be randomly determined.

In step 470, as described above, a determination is made as to whether the TTL value is greater than the TTL threshold in response to the difference between the storage utilizations being greater than a threshold (as determined in step 450). The hill-climbing algorithm does not always settle the placement of the object at the first selected node. A node with minimal storage utilization may be identified after several iterations.

The TTL value is incremented by one whenever the placement of the object is passed to a neighbor node. To minimize the number of times that placement of the object is passed to a neighbor node, the TTL value is compared to a TTL threshold. The TTL threshold may be selected based on a maximum length of time that is allowable for placing an object. The TTL value may be incremented and transmitted from each neighbor node that determines not to place the object. The TTL value may be transmitted to a neighbor node with a request to place the object. If the TTL value is greater than the TTL threshold, then the object may be placed at the node randomly selected in step 410 (step 480). Alternatively, the object may be randomly placed at any of the nodes that have previously rejected placement therein (step 480). If the TTL value is not greater than the TTL threshold, then the method 400 returns to step 430, where storage utilizations for neighbor nodes, for example, of the node 110c are determined.

Generally, when a node is selected using the hill-climbing algorithm, the object is handed over to the selected node. This process continues until all neighbor nodes have higher storage utilizations or the TTL threshold is reached. The object is then placed on the selected node.

The steps of the methods 300 and 400 may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be operable to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Figure 5:
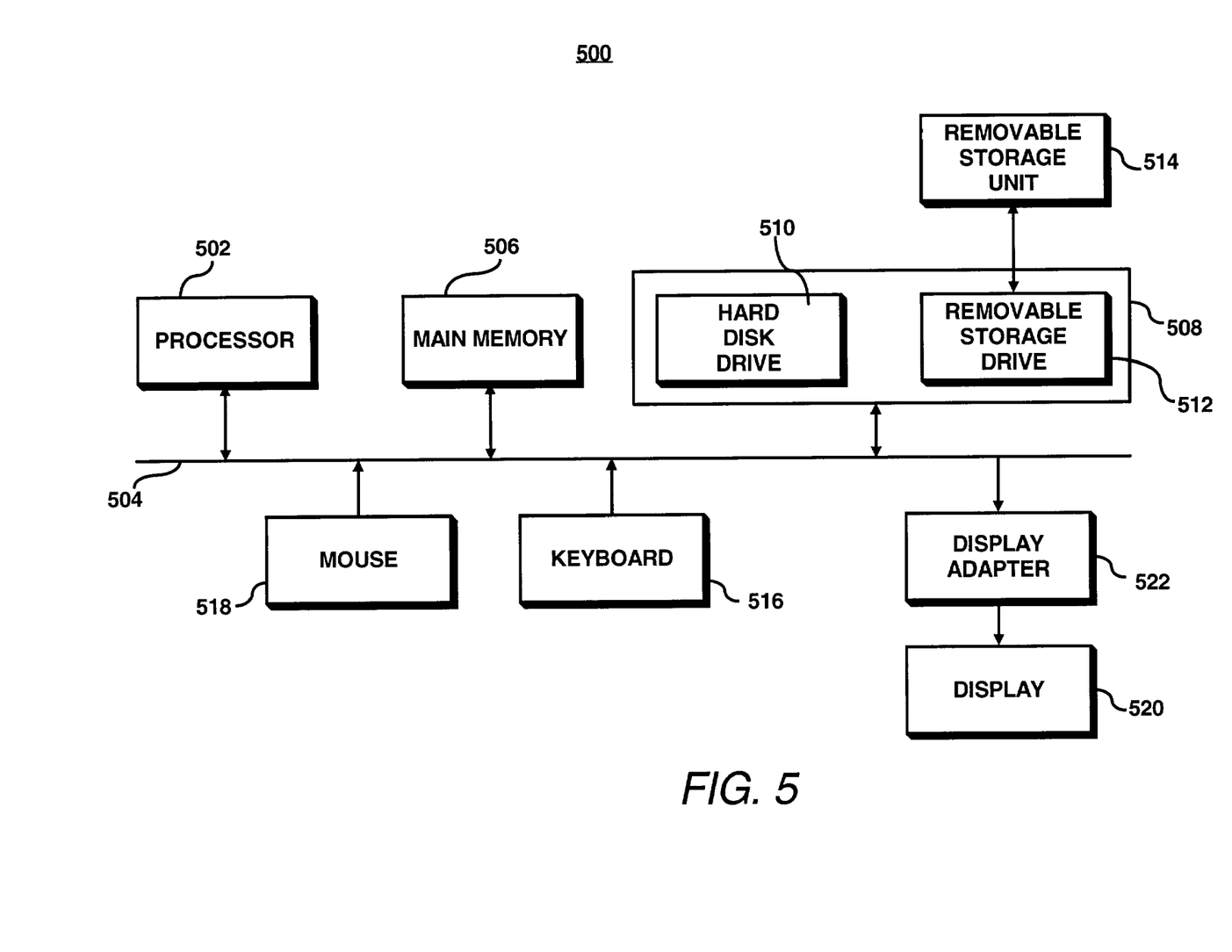
FIG. 5 illustrates a computer platform for a node in the system shown in FIG. 1, according to an embodiment of the invention.

FIG. 5 illustrates an exemplary computer platform 500, according to an embodiment of the invention, for any of the nodes 110a . . . . n or the client 150. The platform includes one or more processors, such as the processor 502, that provide an execution platform for software. The software, for example, may execute the steps of the methods 300 and 400, perform standard P2P functions, etc. Commands and data from the processor 502 are communicated over a communication bus 504. The platform 500 also includes a main memory 506, such as a Random Access Memory (RAM), where the software may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the peer privacy module may be stored. The removable storage drive 512 reads from and/or writes to a removable storage unit 514 in a well-known manner. A user interfaces may interface with the platform 500 with a keyboard 516, a mouse 518, and a display 520. The display adaptor 522 interfaces with the communication bus 504 and the display 520 and receives display data from the processor 502 and converts the display data into display commands for the display 520.

While this invention has been described in conjunction with the specific embodiments thereof, it is evident that many alternatives, modifications and variations will be apparent to those skilled in the art. It will be apparent to one of ordinary skill in the art that the methods 300 and 400 may be modified without departing from the scope of the invention. In particular, although the method of the present invention has been described by examples, the steps of the methods may be performed in different orders or substantially simultaneously. Those skilled in the art will recognize that these and other variations are possible within the scope of the invention as defined in the claims and their equivalents.

What is claimed is:

1. A method for placing an object in a peer-to-peer system using a zoom-in algorithm, the method comprising steps of:
   selecting a parent zone having a plurality of nodes in the peer-to-peer system, the parent zone including a node hosting a parent object;
   dividing the parent zone into k subzones;
   selecting one of the subzones;
   selecting a node in the selected subzone;
   placing the object in the selected node, where the object is a child object to the parent object;
   setting the subzone where the child object is placed to be the parent zone; and
   placing a second child object by repeating the steps of dividing the parent zone;
   selecting one of the subzones; and selecting a node for placing to second child object, wherein the second child object is a child of the child object.

2. The method of claim 1, wherein the step of selecting one of the subzones comprises randomly selecting one of the subzones.

3. The method of claim 1, wherein the step of selecting the node in the selected subzone further comprises randomly selecting the node in the selected subzone.

4. The method of claim 3, wherein the step of selecting a node in the selected subzone further comprises steps of:
   determining a storage utilization for the randomly selected node;
   identifying a neighbor node of the randomly selected node, wherein the identified neighbor node has a lowest storage utilization among at least some neighbor nodes of the randomly selected node; and
   comparing the storage utilization of the randomly selected node to the storage utilization of the identified neighbor node for placing the object.

5. The method of claim 4, wherein the step of selecting the node in the selected subzone further comprises a step of selecting one of the randomly selected node and the identified neighbor node based on the comparison.

6. The method of claim 4, wherein the step of comparing further comprises steps of:

determining whether the storage utilization of the identified neighbor node is less than the storage utilization of the randomly selected node; and
selecting the randomly selected node in response to the storage utilization of the identified neighbor node being greater than the storage utilization of the randomly selected node.

7. The method of claim 6, wherein the step of comparing further comprises steps of:
   determining whether a difference between the storage utilization of the randomly selected node and the storage utilization of the identified neighbor node is greater than a threshold in response to the storage utilization of the identified neighbor node being less than the storage utilization of the randomly selected node;
   selecting the randomly selected node in response to the difference being less than the threshold; and
   determining whether a time-to-live (TTL) value associated with placement of the object is greater than a TTL threshold in response to the difference being greater than the threshold.

8. The method of claim 7, wherein the step of comparing further comprises steps of:
   in response to the TTL value not being greater than the TTL threshold, comparing the storage utilization of the identified neighbor node with a storage utilization of a second neighbor node for placing the object, the second neighbor node being a neighbor to the identified neighbor node; and
   determining whether to select one of the identified neighbor node, the second neighbor node and another node in the peer-to-peer system based on the comparison.

9. The method of claim 7, wherein the step of comparing further comprises steps of:
   in response to the TTL value being greater than the TTL threshold, selecting the randomly selected node.

10. The method of claim 1, wherein k is one of 2, 4, and 8.

11. The method of claim 1, wherein a distributed file system having a known tree structure is overlaid on the peer-to-peer system, and the step of dividing the parent zone further comprises steps of:
    traversing the entire tree to assign a weight to each node, the weight being associated with a storage requirement for a sub-tree rooted at each node; and
    assigning each node to a zone having a zone size proportional to the weight assigned to that node.

12. The method of claim 11, wherein the step of selecting one of the subzones further comprises steps of:
    determining whether the shape of the tree is changed due to new objects being placed; and
    selecting one of the subzones having the least number of nodes.

13. A peer-to-peer system comprising:
    a plurality of nodes including a parent node hosting a parent object;
    the parent node being operable to identify a parent zone including the parent node and to divide the patent zone into a plurality of subzones for placing a child object associated with the parent object; and
    a second node in one of the plurality of subzones, wherein the child object is placed at the second node; the second node being operable to identify a second parent zone including the child object and to divide the second parent zone into a plurality of subzones for placing a second child object, wherein the second child object is a child of the child object.

14. The pear-to-peer system of claim 13, wherein the parent node is further operable to randomly select one of the plurality of subzones for placing the child object.

15. The peer-to-peer system of claim 14, wherein the parent node is further operable to randomly select a node in the selected subzone for placing the child object.

16. The peer-to-peer system of claim 15, wherein the plurality of nodes function as a distributed, file system having a tree structure including a plurality of parent objects and child objects.

* * * * *